United States Patent [19]

Schulmeister et al.

[11] 3,787,244

[45] Jan. 22, 1974

[54] METHOD OF CATALYZING POROUS ELECTRODES BY REPLACEMENT PLATING

[75] Inventors: Lee F. Schulmeister, Wallingford; Richard C. Nickols, Jr., South Windsor, both of Conn.

[73] Assignee: United Aircraft Corporation, East Hartford, Conn.

[22] Filed: Feb. 2, 1970

[21] Appl. No.: 8,035

[52] U.S. Cl. .................. 136/120 FC, 117/130 E
[51] Int. Cl. ........................................ H01m 13/04
[58] Field of Search. 136/120 FC, 86 D; 117/130 E, 117/119

[56] References Cited
UNITED STATES PATENTS

| | | | |
|---|---|---|---|
| 2,409,295 | 10/1946 | Marvin et al. | 117/119 |
| 3,116,165 | 12/1963 | Hipp | 136/120 FC |
| 3,409,472 | 11/1968 | Weber et al. | 136/120 FC |
| 3,097,974 | 7/1963 | McEvoy et al. | 136/120 FC |
| 3,167,457 | 1/1965 | Bacon et al. | 136/120 FC |

FOREIGN PATENTS OR APPLICATIONS

| | | | |
|---|---|---|---|
| 988,174 | 4/1965 | Great Britain | 117/130 E |

*Primary Examiner*—L. Dewayne Rutledge
*Assistant Examiner*—M. J. Andrews

[57] ABSTRACT

A porous or sintered fuel cell electrode which is catalyzed by means of a replacement plating process. An acidic plating solution containing a salt of a noble metal catalyst is forced through the pores of a nickel electrode substrate and the noble metal ions from the dissolved salt replace a thin layer of the nickel surface within the pores.

3 Claims, No Drawings

METHOD OF CATALYZING POROUS ELECTRODES BY REPLACEMENT PLATING

BACKGROUND OF THE INVENTION

1. Field of the Invention

This invention relates to the field of fuel cell electrodes such as used in cells capable of directly generating electrical energy through an electrochemical reaction. More particularly, the invention is concerned with a method of manufacturing porous electrodes which contain a catalyst on the active surfaces of the electrodes to aid the electrochemical reaction.

2. Description of the Prior Art

The continuing development of fuel cells has generated interest in their applications to both scientific and commercial fields. A fuel cell suitable for both of these fields should provide continued power output with little degradation in performance for extended periods of time. The desire to increase the capacity of the cell has prompted extensive development in the field of porous electrodes. The porosity of the electrodes provides a greater surface area through which the cell electrolyte can operate and increases the electrical power output without substantially expanding the physical size of the cell.

It is common practice to provide a highly activated surface on the fuel cell electrodes by means of a catalyst which aids the electrochemical process. The catalysts are generally noble metals such as gold, silver, platinum, palladium and other metals of the platinum group. Because of the extreme cost of these metals extensive use is economically not feasible. Economic considerations require that the catalysts be used in small quantities in the most efficient way possible. For these reasons catalysts are generally applied to a substrate material which forms the principal structural portion of the electrode. The catalysts are applied in a very thin film sufficient to catalyze the electrochemical process.

The application of the noble metal catalysts to porous electrodes has elicited a number of new processes for forming thin coatings of an adequate quantity of the catalyst on the electrode substrate. The catalysts are frequently impregnated in the pores of the electrode by a filtration process. In these processes the catalysts are pulverized and filtered or impregnated within the pores by drawing the pulverized catalysts through the porous substrate in a differential pressure process. These filtering processes require an extremely fine powder of the catalytic material in order to get sufficient coverage of the pore surfaces without clogging the pores. Oxides or salts of the catalysts are ground to a very fine particle size and colloidally suspended in a fluid media which is subsequently drawn through the porous substrate. The coated substrates are then exposed to a reducing gas such as hydrogen to reduce the oxide or salt of the noble metal to the pure metallic element which best serves the electrochemical process of the fuel cell. U.S. Pat. Nos. 3,097,115; 3,097,974; 3,171,757 and 3,309,231 all disclose such impregnating processes for porous electrodes.

Due to the very fine size of the pores in the electrodes, catalytic particles must be pulverized to a size which is several orders of magnitude smaller than the pores to permit adequate coverage of the pore surfaces. This requirement necessitates starting with the catalysts in a form other than the pure metal and a reduction of the metal back to its pure state after it had been dispersed in a thin coating within the pores. Such a process is indirect and requires several chemical conversions of the catalysts both before and after impregnation to achieve a useful final catalytic coating in the pure form. Furthermore, the impregnation process is frequently followed by a binding process in which a binder is superimposed on the deposited particles to provide a secure and durable attachment of the coating with the base material. U. S. Pat. No. 3,171,757 suggests that the binder may be the catalytic material itself and may be deposited by electroplating or chemical deposition processes.

It would be desirable therefore to have a more direct process which does not require conversion of the catalyst into a powder form and reduction to precipitate the pure metal on the exposed surface of the pores.

Furthermore, it would be desirable to directly attach the catalyst in intimate relationship with the base material without the use of an additional binder to retain the catalyst in place. An intimate relationship at the surface of the substrate lowers the internal electrical resistance of the cell and consequently reduces internal power losses.

SUMMARY OF THE INVENTION

This invention relates to a process of coating a porous electrode directly with a noble metal catalyst. More particularly, the coating is formed on the surfaces of the pores throughout the electrode by means of a replacement plating process.

A noble metal catalyst in a salt form, such as a chloride, is dissolved in an acid solution having a preselected pH factor. The solution is then forced through the porous metallic electrode substrate. The ions of the catalyst are interchanged with the metallic ions from the surface of the substrate. The replacement process therefore substitutes a catalyst such as platinum, palladium or gold for the metallic surface of the pores with the aid of the acid. The metallic ions removed from the substrate are then drawn off with the depleted acid solution.

The substrate material in one embodiment of the invention is a nickel substrate which has suitable electrical characteristics and corrosion resistance to provide the electrical output desired of the fuel cell. The nickel also possesses sufficient strength characteristics to provide structural integrity within the cell.

Successful replacement plating with the noble metal catalysts requires that the pH factor of the acidic solvent be controlled to provide the correct distribution of the catalysts within the pores. In general, the pH factor should lie between 0.5 and 2.0. Too much acidity causes a degradation of the nickel substrate and too little acidity attenuates the ion exchange between the catalyst and the substrate.

Proper control of the flow rate of the solution through the porous sinters commensurate with the acidity of the solution is also important to obtain the correct distribution of the catalyst. Generally, flow rates on the order of $20cc/sec/cm^2$ are appropriate for a number of specimens in solutions having a pH of 1.0. If the pore size is as small as 2–3 microns the flow rate of the plating solution may be reduced to 5–10 $cc/sec/cm^2$. A corresponding pH factor of 2.0 is necessitated by such small pore sizes to prevent greater plating on the exterior surfaces of the substrate than is possible within the pores where removal of the depleted solution is impeded by the finer pore size. Flow rates of the solution and the pH factors must be correspondingly adjusted according to the porosity and surface conditions of the substrate. If an open porous substrate is heavily oxidized, a pH factor of 0.5 is used in order to adequately reduce the oxide coating prior to plating with the noble metal ions.

Coplating of two or more noble metal catalysts is accomplished by employing salts of a plurality of catalysts in the plating solution. The salts, principally chlorides of platinum, palladium and gold, are dissolved in various concentrations with respect to one another and proportional amounts of the catalysts replace the substrate material during the plating process. The multiple plating process permits a more rapid production rate for the electrodes and assures that the different catalysts will be intimately joined with low electrical resistance to the substrate material due to the ionic bonding at the substrate surface.

DESCRIPTION OF THE PREFERRED EMBODIMENTS

According to the new and novel method for producing a fuel cell electrode with a noble metal catalyst intimately joined to the surface of the electrode of the present invention, the process is begun by selecting a suitable substrate material for the electrode. The selection is governed by a number of factors such as the desired operating characteristics and the structural requirements of the electrode which in turn may be dictated by the particular configuration of the fuel cell. Electrodes of planar, cylindrical or other shapes may be catalyzed according to the present process without interferring with the essential objects of the invention. The base material of the electrode can be selected from the transition metals which are capable of being plated such as nickel, cobalt and iron. The essential characteristics of the substrate material aside from its capability of being plated are its high electrical conductivity and corrosion resistance.

Since the plating process relies upon the replacement of the substrate by the ions of the catalysts in an acid solution, it is necessary to select a salt of the appropriate catalyst which can be dissolved in an acid solution. The frequently used salts for the plating process are chlorides selected from the group consisting of chlorides of platinum, palladium or gold. It is well known that one of the principal properties of the noble metals is their extreme stability in the pure form. The pure metals resist chemical reaction even in the presence of promoters or activators such as acid solutions. It is, in fact, this stability which permits their use as catalysts in the electrochemical action of the fuel cell. Because of the stability and because of the need for a free ion interchange during the plating process, a soluble salt such as a chloride of the noble metal is selected to be mixed with a solvent such as hydrochloric acid. Chlorides may be dissolved in hydrochloric solutions having molar concentrations between 0.1–1 N to obtain the proper plating solution. Other solvents such as nitric acid may be employed. Generally, a suitable solvent is the acid which has the same radical as the salt producing the noble metal ions. The plating solution is then forced through the porous substrate by applying a pressure differential across the substrate in any convenient manner. A typical example of this procedure is found in the filtration processes of the prior art where a vacuum is generated on the one side of the substrate to draw the solution through the porous matrix of the base material. The vacuum process is frequently used due to its simplicity and adaptability to electrodes of both planar and cylindrical shapes. If the electrode is planar, the solution can be forced through the pores by positioning the untreated electrode in a horizontal position and in sealed relationship with the sidewalls of a vertical tank. The solution containing the dissolved salts of the noble metal catalysts is poured on top of the porous electrode and a partial vacuum is drawn on the bottom side of the electrode. By controlling the pressure of the partial vacuum, the total pressure differential across the electrode can be adjusted which, in turn, regulates the flow rate of the solution through the porous matrix.

Cylindrical or curved electrodes can be treated in a similar manner by positioning the electrode coaxially within a vertical cylindrical tank. The ends of the electrode are sealed against the ends of the tank and a conduit fills the inner volume of the electrode with the plating solution. A partial vacuum is then drawn between the outer surface of the electrode and the inner surface of the tank to force the solution through the porous matrix. To insure that the coating is uniformily applied at all portions of the cylindrical matrix, the plating solution is continuously supplied to the inner volume of the electrode to maintain a continuous flow through the cylindrical electrode at all elevations within the cyindrical tank. If the vertical pressure gradient caused by the liquid solution within the tank tends to unbalance the flow rates through the matrix at different vertical stations, it may be desirable to repeat the process with the tank in an inverted position to obtain a uniform coating at all points of the electrode.

The ionic reaction at the interface of the solution and the pore surfaces has been found to depend on a number of factors. If the acidity of the solvent is too strong for the matrix material, a degradation of the substrate takes place. For example, it has been found necessary to limit the pH of the acid to values no less than 0.5 for average pore size sinters in the order of 5–7 microns. Normally a pH of 1.0 is satisfactory. If the acidity is too weak, the substrate resists attack by the acid and no replacement with the catalytic ions takes place. Acidities weaker than a pH of 2.0 are generally ineffective for the plating of catalytic ions.

Time is another factor related to both the attacking of the substrate material by the acid and the degree to which the ion exchange takes place. In order to have a uniform plating on both the exterior surfaces of the substrate as well as the interior surfaces of the matrix, the flow rate of the solution must be held at a relatively high value, on the order of $20 cc/sec/cm^2$ for an average pore size sinter. If a smaller flow rate is used, the time at which the internal pore surfaces are exposed to the undepleted solution is too short to permit an adequate coating of the catalytic elements to form in comparison to the rapid and continued reaction which takes place externally of the substrate.

A corresponding reduction in the acidity is called for when the flow rate of the solution is reduced by a smaller pore size, again to inhibit an inordinate amount of plating on the exterior surfaces of the substrate matrixes. For example, if the flow rate is reduced from $20 cc/sec/cm^2$ to $10 cc/sec/cm^2$ when the pore size is reduced from 5–7 microns to 2–3 microns, the pH factor is changed from 0.5–1.0 to 2.0. The precise concentrations would, of course, be established with the flow rates prior to initiation of the plating process but the workable pH range is from 0.5 to 2.0. The change in flow rates referred to does not occur during the plating of given substrate but changes from one substrate to another depending upon the porosity of the matrix.

Since the acidity controls the degree to which the acid attacks the substrate material, it is necessary to vary the acidity for other conditions of the substrate surfaces such as the presence of an oxide coating. Nickel base substrates frequently contain heavy oxide coatings and require a stronger solution for the initial coating of the catalyst than is necessary for a subsequent coating. The precise thickness of the finished coat may be determined by successive platings and the resistance of the noble metal catalyst to oxidation requires that the acidity of the plating solution between successive platings be reduced to avoid any degradation of the lightly coated substrate.

The co-plating of the substrate with two or more materials is readily accomplished by dissolving salts of the respective catalysts in the same acid solution. The replacement of a nickel ion, for example, with either a platinum or a palladium ion can be accomplished with the same acid solution regardless of the presence of other foreign ions in the solution. In one example, platinum and palladium were co-plated on a nickel substrate from solutions having relative concentrations of platinum chloride and palladium chloride which varied over the entire range of relative compositions. In a similar example, platinum and gold chlorides in various combinations were also co-plated without adverse results. As a consequence, the production of multiple coatings can be accelerated by the simultaneous replacement plating of different catalysts.

In accordance with the above teachings, several examples of plating processes follow.

EXAMPLE I

A nickel substrate of a planar shape was successfully plated with both platinum and palladium catalysts. The nickel substrate had an area of approximately 64 square inches, 75–80 percent porosity and pore sizes of 5–7 microns. The substrate was placed in a plating solution formed by hydrochloric acid and salts of both platinum and palladium chlorides. The ratio of the chlorides was 25 percent by weight platinum chloride and 75 percent by weight palladium chloride. The concentration of the two salts together provided approximately 5.2 grams of salt per liter of solution. The salt concentrations were based upon the amount of catalyst which was to be deposited on the substrate since the saturation point was not exceeded. The pH of the solution was approximately 1.0 and the solution was forced through the substrate with a flow rate of approximately 20cc./sec./cm.$^2$. It was found that substantially all of the catalytic ions were plated onto the substrate when the solution had changed from a dark brown color to a light green color indicating the presence of nickel chloride salt in the solution.

EXAMPLE II

The nickel substrate in this case was formed by two layers of substrate secured in side-by-side relationship. The characteristics of the one substrate layer were identical to those cited in Example I. The second substrate layer had a porosity of 40 percent and pore sizes ranging between 2–3 microns. Due to the reduced porosity of the one of the substrate layers, the flow rate of the plating solution through the laminated substrate structure was 10cc./sec./cm.$^2$ which required a change in the pH of the solution to 2.0. Otherwise, the solution contained the same weight ratios of palladium and platinum chlorides and was employed in the same manner as in Example I.

EXAMPLE III

The nickel substrate in this case was the same as that used in Example I except that a heavy oxide coating covered the external surface of the porous material. The plating solution was also the same as that employed in Example I except that the pH factor had to be changed to 0.5. The increased acidity was needed to achieve the appropriate color change from brown to pale green which characterizes the successful exchange of the nickel and catalytic ions. Solutions having a pH of 1.0 and higher numerical values failed to produce the characteristic color change when a scaling oxide appeared on the substrate surface.

EXAMPLE IV

The nickel substrate in this example is essentially the same as that employed in Example I. The plating solution was also the same except that the catalytic ions were formed solely from platinum chloride. The plating solution therefore contained 100 percent by weight platinum chloride rather than the mixed salt solution of the previous Examples. It was also noted that no change in the pH factor was required when the single salt was employed.

Other examples in which the platinum and palladium ions were jointly plated have also been successfully tested. The ratios of the various salts were varied in the different tests by 5 percent increments throughout the complete range between 100 percent of either salt. In still other examples, gold chloride and platinum chloride were jointly plated successfully with the same variation in weight ratios. In each instance the pH factor of the plating solution did not vary.

It will be understood that while specific examples of the novel plating process have been disclosed throughout the specification, the general teachings of the invention can be employed in various forms without departing from the spirit of the invention. The replacement plating of sintered electrodes deposits the catalyst in the pure metallic state without requiring subsequent reduction of salts of the catalysts either before or after coating the matrix material. The process also insures that a strong ionic bond with low electrical resistance exists between the substrate and the catalysts even where several catalysts are co-plated. The ability to vary the plating control parameters such as acidity and flow rate of the plating solution facilitates the even distribution of the activating catalytic material throughout the porous sinter and thereby insures an electrochemical reaction within an operating fuel cell wherever there is an interface of the electrode and electrolyte.

Having thus described our invention we claim:

1. A method of catalyzing a porous nickel fuel cell electrode having pores varying in average size throughout the electrode of from 2–3 microns to 5–7 microns, comprising the steps of:

selecting a plating solution containing at least one salt of a noble metal catalyst and an acid solvent;

adjusting the acidity of the plating solution to a selected pH within the range of 0.5 to 2 in accordance with the surface condition and pore size of the electrode;

causing the plating solution to flow through the electrode at a selected flow rate within the range of 5cc/sec/cm² to 20cc/sec/cm² whereby an ion exchange reaction takes place substantially uniformly at the surface and within the pores of the electrode;

said flow rate and pH range and pore size being interrelated such that for decreasing pore size within the range of from 2–3 microns to 5–7 microns the flow rate is selected at decreasing rates within said flow rate range of 5cc/sec/cm² to 20cc/sec/cm² and the pH is selected at increasing values within said pH range of from 0.5 to 2, and conversely for increasing pore size within the range of from 2–3 microns to 5–7 microns the flow rate is selected at increasing rates within said flow rate range of 5cc/sec/cm² to 20cc/sec/cm² and the pH is selected at decreasing values within said pH range of from 0.5 to 2; and removing the depleted plating solution from contact with the electrode at the completion of the ion exchange reaction.

2. The method of claim 1 wherein the noble metal catalyst salt is selected from the group consisting of chlorides of platinum, palladium and gold.

3. The method of claim 2 wherein the plating solution contains salts of more than one noble metal catalyst.

* * * * *